(12) United States Patent
Hotta et al.

(10) Patent No.: US 12,372,136 B2
(45) Date of Patent: Jul. 29, 2025

(54) VEHICLE POWER TRANSMISSION APPARATUS

(71) Applicants: Toyota Jidosha Kabushiki Kaisha, Toyota (JP); Denso Corporation, Kariya (JP)

(72) Inventors: Shintaro Hotta, Shizuoka-ken (JP); Masaki Amakawa, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 18 days.

(21) Appl. No.: 18/540,017

(22) Filed: Dec. 14, 2023

(65) Prior Publication Data

US 2024/0200634 A1    Jun. 20, 2024

(30) Foreign Application Priority Data

Dec. 19, 2022    (JP) .................................. 2022-202571

(51) Int. Cl.
    *F16F 15/315*    (2006.01)
    *B60K 6/485*    (2007.10)

(52) U.S. Cl.
    CPC .......... *F16F 15/3153* (2013.01); *B60K 6/485* (2013.01)

(58) Field of Classification Search
    CPC ......... F16F 15/3153; F16D 1/076; F16D 1/08
    See application file for complete search history.

(56) References Cited

U.S. PATENT DOCUMENTS

| 2013/0324361 A1* | 12/2013 | Kamiyama | B60K 6/40 |
| | | | 903/902 |
| 2016/0252136 A1 | 9/2016 | Hohenner et al. | |
| 2018/0328413 A1* | 11/2018 | Yagyu | F16D 3/52 |

FOREIGN PATENT DOCUMENTS

| CH | 351805 A | * | 1/1961 | |
| JP | S5899524 U | * | 7/1983 | |
| WO | WO-2012137508 A1 | * | 10/2012 | B60K 6/387 |
| WO | WO-2020241824 A1 | * | 12/2020 | F16D 1/076 |

OTHER PUBLICATIONS

USPTO Machine Translation (retrieved from FIT database) of the Description of WO 2020/241824 A1, Ogawa et al., Dec. 3, 2020. (Year: 2025).*

* cited by examiner

*Primary Examiner* — Daniel D Yabut
(74) *Attorney, Agent, or Firm* — Dinsmore & Shohl LLP (57) ABSTRACT

A vehicle power transmission apparatus including: (i) a flywheel provided with a center hole in which an end portion of a crankshaft of an engine is inserted such that an outer circumferential surface of the end portion of the crankshaft is fitted in a fitting portion of the center hole; (ii) an input shaft to which a power of the engine is transmitted through the flywheel; and (iii) a disk including an outer peripheral portion connected to an outer peripheral portion of the flywheel, and provided with a center hole spline-fitted on an outer circumferential surface of an engine-side end portion of the input shaft. The outer circumferential surface of the engine-side end portion of the input shaft has a diameter larger than a diameter of the fitting portion of the center hole of the flywheel.

5 Claims, 6 Drawing Sheets

VEHICLE POWER TRANSMISSION APPARATUS

CROSS-REFERENCE TO RELATED APPLICATION

This application claims priority from Japanese Patent Application No. 2022-202571 filed on Dec. 19, 2022, the disclosure of which is herein incorporated by reference in its entirety.

TECHNICAL FIELD

The present disclosure relates to a vehicle power transmission apparatus including an input shaft to which a power of an engine is to be transmitted through a flywheel.

BACKGROUND

There is well-known a vehicle power transmission apparatus including an input shaft to which a power of an engine is to be transmitted. For example, U.S. Patent Application Publication No. 2016/0252136 discloses such a vehicle power transmission apparatus. The disclosed vehicle power transmission apparatus has a damper-less structure, i.e., a structure that does not require a damper to be provided in a power transmission path between the engine and the input shaft.

SUMMARY

By the way, where the damper-less structure is employed, resonance caused by the engine as a vibration source in a drive system is likely to be problematic. For example, in an operation speed range of the engine, there is a possibility that large resonance could occur to reduce durability of the drive system. It might be possible to deviate a resonance point from the operation speed range, by increasing rigidity of the input shaft. However, if it is difficult to increase the diameter of the input shaft due to a constraint such as a diameter of a crankshaft of the engine, it is difficult to increase the rigidity of the input shaft.

The present disclosure was made in view of the background art described above. It is therefore an object of the present disclosure to provide a vehicle power transmission apparatus which has a damper-less structure and which is capable of suppressing resonance of a drive system.

The object indicated above is achieved by an essence of the present disclosure.

According to the essence of the present disclosure, there is provided a vehicle power transmission apparatus including: (i) a flywheel provided with a center hole in which an end portion of a crankshaft of an engine is to be inserted such that an outer circumferential surface of the end portion of the crankshaft is to be fitted in a fitting portion of the center hole; (ii) an input shaft to which a power of the engine is to be transmitted through the flywheel; and (iii) a disk including an outer peripheral portion that is connected to an outer peripheral portion of the flywheel, and provided with a center hole that is spline-fitted on an outer circumferential surface of an engine-side end portion of the input shaft. The outer circumferential surface of the engine-side end portion of the input shaft, which is spline-fitted in the center hole of the disk, has a diameter larger than a diameter of the fitting portion of the center hole of the flywheel which is to be fitted on the outer circumferential surface of the end portion of the crankshaft.

In the power transmission apparatus according to the essence of the present disclosure, the input shaft to which the power of the engine is to be transmitted through the flywheel is constructed, such that the outer circumferential surface of the engine-side end portion of the input shaft, which is spline-fitted in the center hole of the disk, has the diameter larger than the diameter of the fitting portion of the center hole of the flywheel which is to be fitted on the outer circumferential surface of the end portion of the crankshaft. Thus, it is possible to increase rigidity of the input shaft, as compared with a case in which the diameter of the input shaft cannot be increased due to a constraint such as the diameter of the crankshaft. Therefore, resonance of the drive system can be suppressed even in the damper-less structure.

DETAILED DESCRIPTION OF EMBODIMENTS

There will be described embodiments of the present disclosure in details with reference to drawings.

First Embodiment

Figure 1:
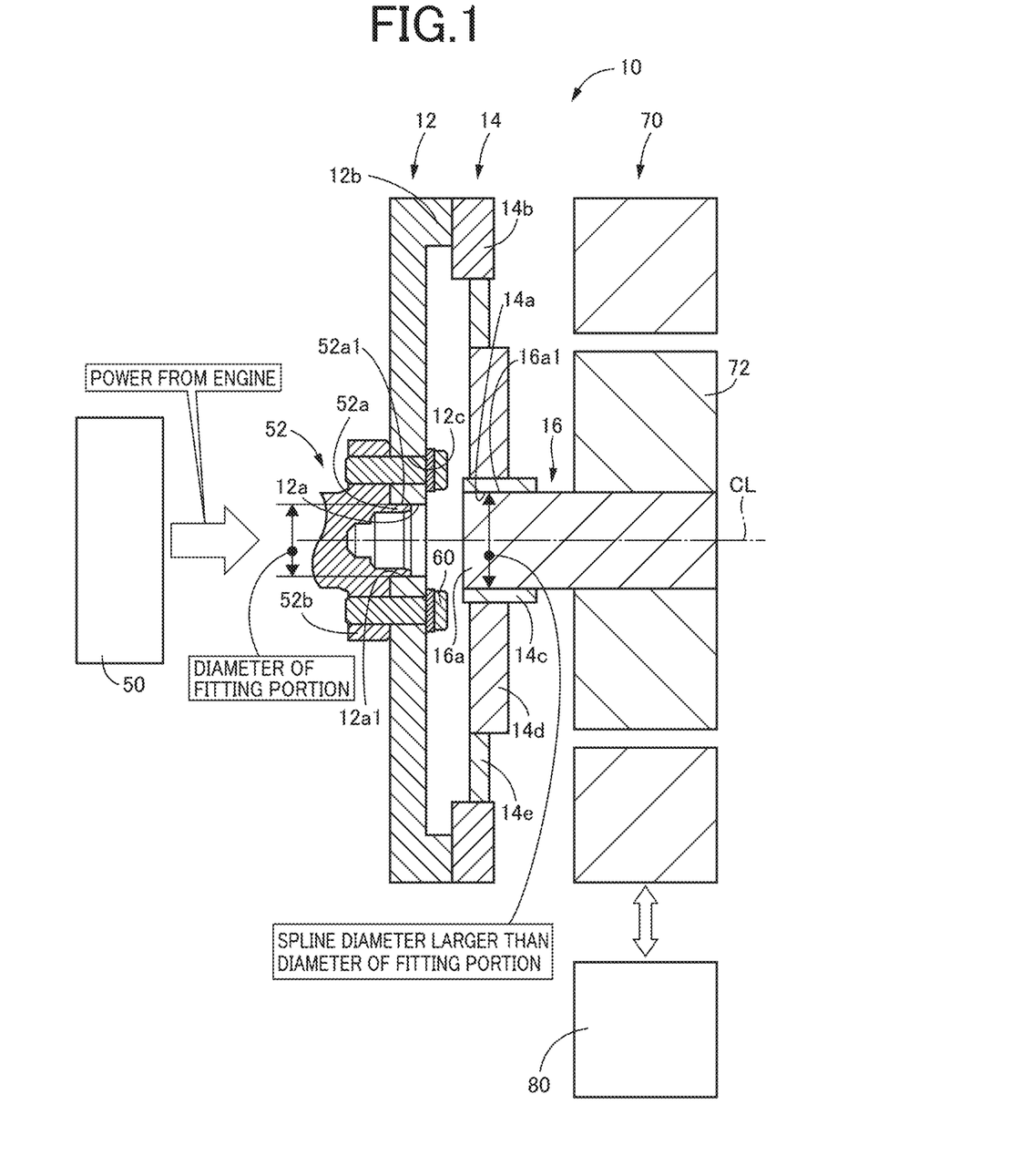
FIG. 1 is a cross sectional view schematically showing a construction of a vehicle power transmission apparatus according to a first embodiment of the present disclosure.

FIG. 1 is a cross sectional view schematically showing a construction of a vehicle power transmission apparatus 10 according to a first embodiment of the present disclosure. As shown in FIG. 1, the power transmission apparatus 10 includes a flywheel 12, a disk 14 and an input shaft 16 that are disposed on a rotation axis CL.

The flywheel 12 is provided with a center hole 12a located at a center of rotation and formed through the flywheel 12. In the center hole 12a, an end portion 52a of a crankshaft 52 of an engine 50 is to be inserted such that an outer circumferential surface 52a1 of the end portion 52a of the crankshaft 52 is to be fitted in a fitting portion 12a1 of the center hole 12a. The crankshaft 52 includes a flange portion 52b located on an outer side of the end portion 52a in a radial direction of the crankshaft 52. The flywheel 12 is provided with a plurality of bolt receiving holes 12c which are located on an outer side of the center hole 12a in a radial direction of the flywheel 12 and which are arranged at a predetermined interval in a circumferential direction of the flywheel 12. The flywheel 12 is to be fastened to the flange portion 52b of the crankshaft 52, by fastening bolts 60 received in the bolt receiving holes 12c.

The disk 14 is provided with a center hole 14a located at the center of rotation and formed through the disk 14. The disk 14 is connected at its outer peripheral portion 14b to an outer peripheral portion 12b of the flywheel 12, for example, through bolts (not shown). The center hole 14a is spline-fitted on an outer circumferential surface 16a1 of an engine-side end portion 16a of the input shaft 16. The engine-side end portion 16a is one of axially opposite end portions of the input shaft 16, which is closer to the engine 50 than the other of the axially opposite end portions of the input shaft 16.

To the input shaft 16, a power of the engine 50 is to be transmitted through the flywheel 12 and the disk 14. The input shaft 16 is connected in a power transmittable manner to a rotor 72 of an electric motor 70 of inner rotor type. Thus, the input shaft 16 serves also as a rotor shaft of the electric motor 70. Alternatively, the input shaft 16 may be connected integrally to a rotor shaft of the electric motor 70. The electric motor 70 serves as a generator that is caused, by the power of the engine 50, to generate an electric power to be supplied to an electric motor 80 configured to generate a drive torque, for example. The electric power generated by the electric motor 70 is supplied to the electric motor 80 via an inverter (not shown), or supplied to a battery (not shown) via an inverter (not shown) such that the battery is charged with the supplied electric power.

Figure 6:
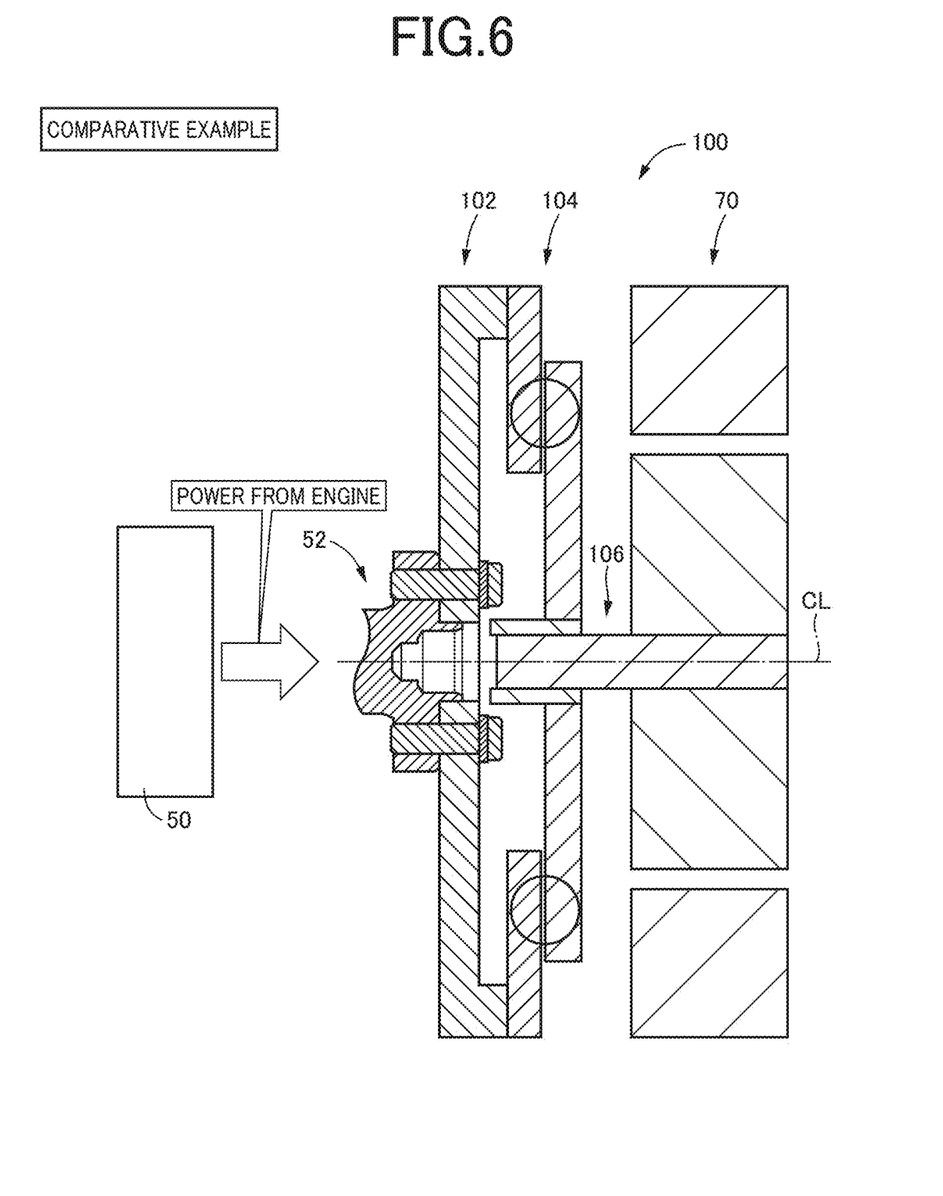
FIG. 6 is a cross sectional view schematically showing a construction of a vehicle power transmission apparatus according to a comparative example, wherein the power transmission apparatus includes a damper.

FIG. 6 is a cross sectional view schematically showing a construction of a vehicle power transmission apparatus 100 according to a comparative example. As shown in FIG. 6, the power transmission apparatus 100 includes a flywheel 102, a damper 104 and an input shaft 106 that are disposed on the rotation axis CL. Like the flywheel 12, the flywheel 102 is to be fastened to the crankshaft 52. Like the input shaft 16, the input shaft 106 is to be connected in a power transmittable manner to the electric motor 70. Like the disk 14, the damper 104 is connected at its outer peripheral portion 14b to an outer peripheral portion of the flywheel 102, and is spline-fitted at its inner peripheral portion with the input shaft 106. That is, in the power transmission apparatus 100, the damper 104 is provided in a power transmission path between the flywheel 102 and the input shaft 106. In the power transmission apparatus 10 of the embodiment of the present disclosure shown in FIG. 1, the damper 104 is replaced by the disk 14. That is, the power transmission apparatus 10 has a damper-less structure without the damper 104.

Figure 2:
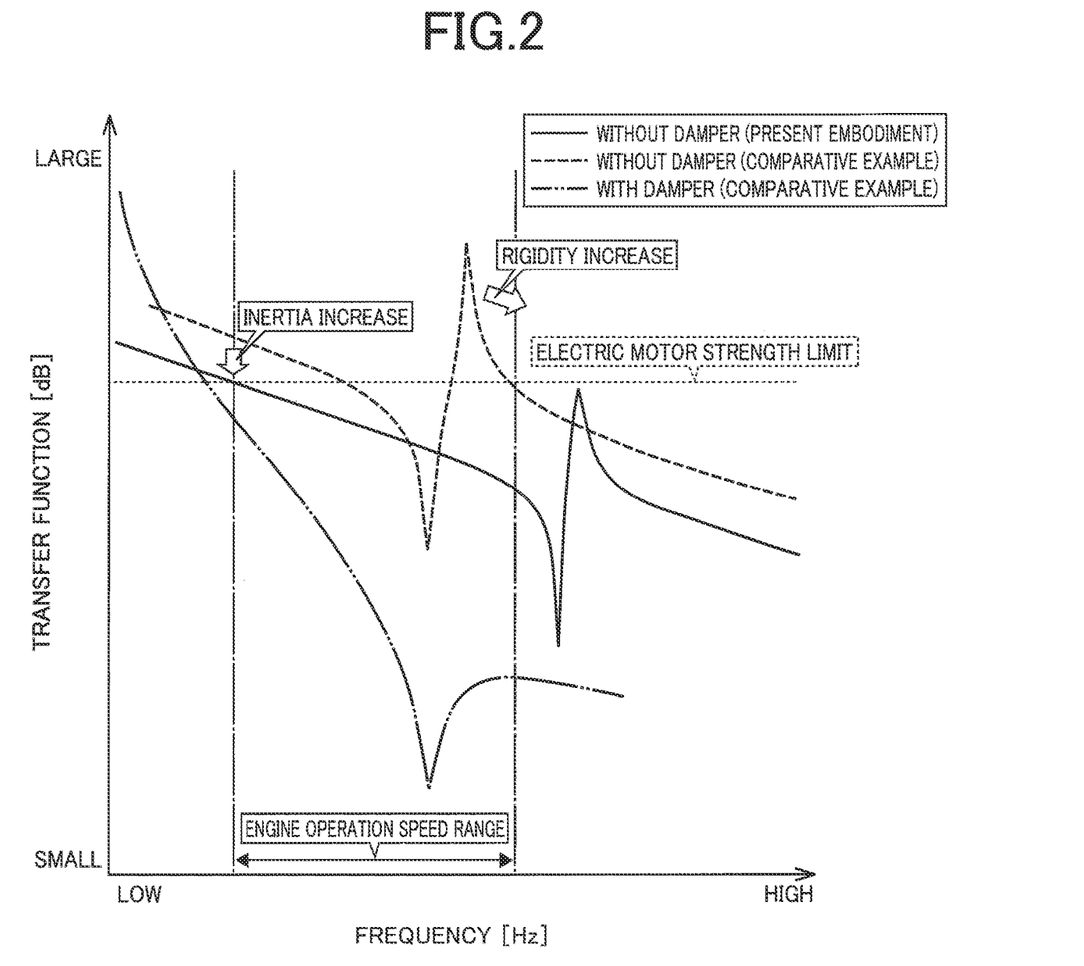
FIG. 2 is a view showing examples of frequency characteristic of a drive system.

FIG. 2 is a view showing examples of frequency characteristic of a drive system. In FIG. 2, two-dot chain line represents an example of the frequency characteristic in a comparative example in the form of the power transmission apparatus 100 including the damper 104, broken line represents an example of the frequency characteristic in another comparative example in the form of a vehicle power transmission apparatus in which the damper 104 is simply replaced by the disk 14, and solid line represents an example of the frequency characteristic in the present embodiment. Where the damper-less structure is employed, as shown in the broken line, a resonance region falls within an operation speed range of the engine 50, so that there is a possibility that vibrations exceeding a strength upper limit of the electric motor 70 could occur in the operation speed range of the engine 50. It might be possible to suppress vibrations in the vehicle power transmission apparatus with the damper-less structure, for example, by increasing rigidity of the input shaft, specifically, by increasing a diameter of the input shaft. However, it is not easy to increase the diameter of the input shaft due to a constraint such as a diameter of the crankshaft 52, as shown in FIG. 6. Particularly, where the input shaft includes a projecting portion which projects from a spline fitting portion toward the engine 50 and which has a distal end portion slidably fitted in an inner circumferential surface of the end portion 52a or fixed through a bearing in the inner circumferential surface of the end portion 52a, the spline fitting portion necessarily has substantially the same diameter as a diameter of the distal end portion.

Referring back to FIG. 1, in the power transmission apparatus 10 of the present embodiment, the engine-side end portion 16a, i.e., the spline fitting portion of the input shaft 16, is offset toward the electric motor 70 and the diameter of the engine-side end portion 16a is increased. Where the input shaft 16 includes a projecting portion projecting from the engine-side end portion 16a toward the engine 50, the diameter of the engine-side end portion 16a or a portion closer to the electric motor 70 than the engine-side end portion 16a is increased, without a diameter of the projecting portion being increased. For example, the diameter of the engine-side end portion 16a of the input shaft 16, i.e., a spline diameter, is made larger than the diameter of the fitting portion 12a1.

Further, the vibrations can be suppressed by increasing inertia of members connected to the input shaft 16 and the input shaft 16 itself (see FIG. 2). In the power transmission apparatus 10, the inertia can be gained by the rotor 72 and the flywheel 12, for example.

Further, where the damper-less structure is employed, a weak part of the drive system is likely to be reduced in durability when a high torque is applied thereto. The power transmission apparatus 10 of the present embodiment is provided with a part weak to such an application of the high torque, so that the high torque is absorbed in the weak part. In the power transmission apparatus 10 of the present embodiment, the weak part is provided in the disk 14.

Figure 3:
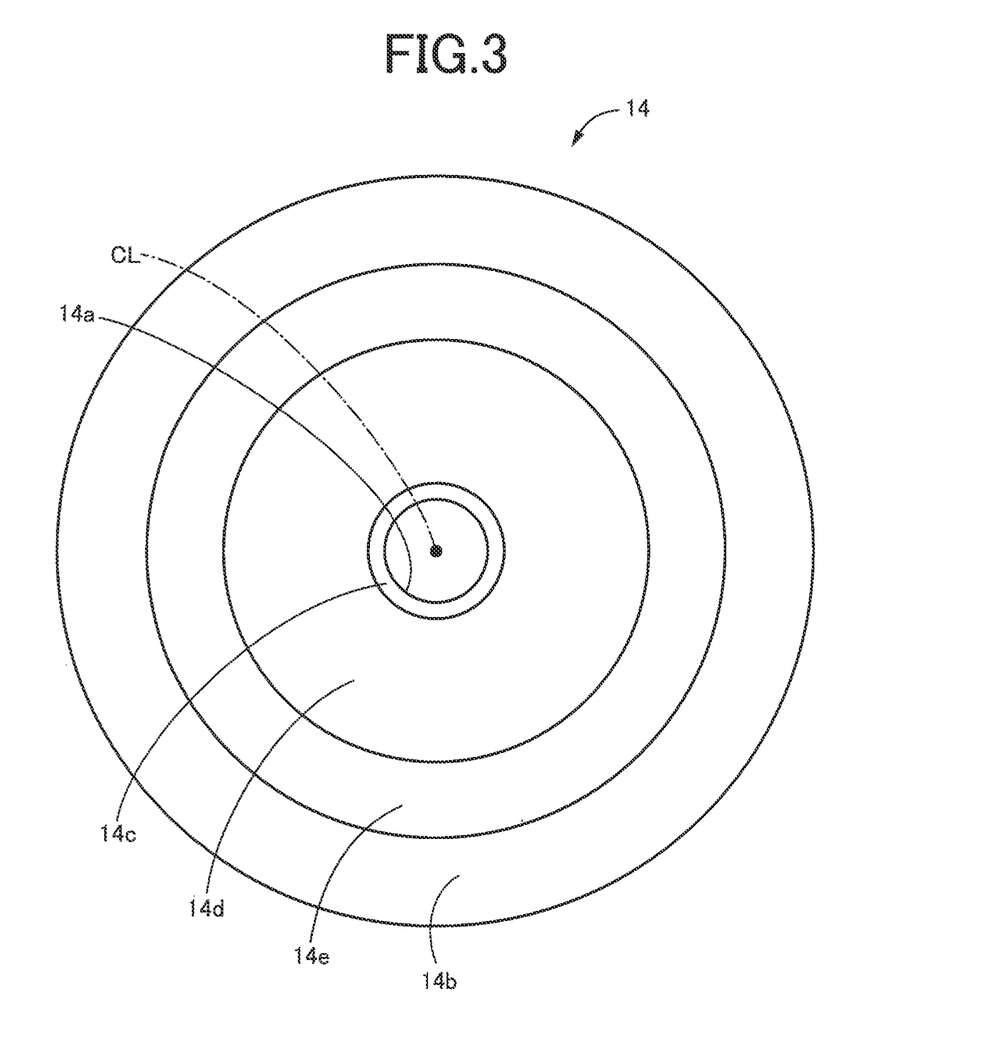
FIG. 3 is a front view showing an example of a disk as seen from side of an electric motor.

FIG. 3 is a front view showing an example of the disk 14 as seen from side of the electric motor 70. As shown in FIG. 3, the disk 14 includes, in addition to the above-described outer peripheral portion 14b, a base portion 14c adjacent to the center hole 14a, an extension portion 14d extending outwardly from the base portion 14c in a radial direction of the disk 14, and a vulnerable portion 14e as the weak part extending outwardly from the extension portion 14d in the radial direction. The vulnerable portion 14e is contiguous to the outer peripheral portion 14b. The vulnerable portion 14e has a thickness smaller than those of other portions such as the extension portion 14d and the outer peripheral portion 14b (see FIG. 1). That is, the disk 14 includes the vulnerable portion 14e as an annular-shaped thin portion, which is located on an outer side of the center hole 14a in the radial direction of the disk 14, and which has the thickness smaller than those of the other portions of the disk 14. Thus, when a high torque is applied to the drive system, transmission of the high torque is suppressed by the vulnerable portion 14e, for example. In this instance, the vulnerable portion 14e could be damaged and the power of the engine 50 could not be transmitted to the electric motor 70. In such a case, an evacuation or limp-home driving is performed, for example, by the electric motor 80, to a repair shop or the like.

As described above, in the present embodiment, the input shaft 16 is constructed such that the engine-side end portion 16a has the diameter larger than the diameter of the fitting portion 12a1 of the flywheel 12. Thus, it is possible to increase rigidity of the input shaft 16, as compared with a case in which the diameter of the input shaft 16 cannot be increased due to a constraint such as the diameter of the crankshaft 52. Therefore, resonance of the drive system can be suppressed even in the damper-less structure.

In the present embodiment, the disk 14 includes the vulnerable portion 14c. Therefore, when a large or high torque is applied thereto, a fuse function is provided by the vulnerable portion 14e, so that it is possible to suppress reduction of durability of other parts of the drive system other than the disk 14.

In the present embodiment, the input shaft 16 is connected in a power transmittable manner to the rotor 72 of the electric motor 70 of inner rotor type. Thus, inertia can be gained by the rotor 72 of the electric motor 70 so that it is possible to further suppress resonance of the drive system.

There will be described other embodiments of the present disclosure. The same reference signs as used in the above-described embodiment will be used in the following embodiments, to identify the practically corresponding elements, and descriptions thereof are not provided.

Second Embodiment

Figure 4:
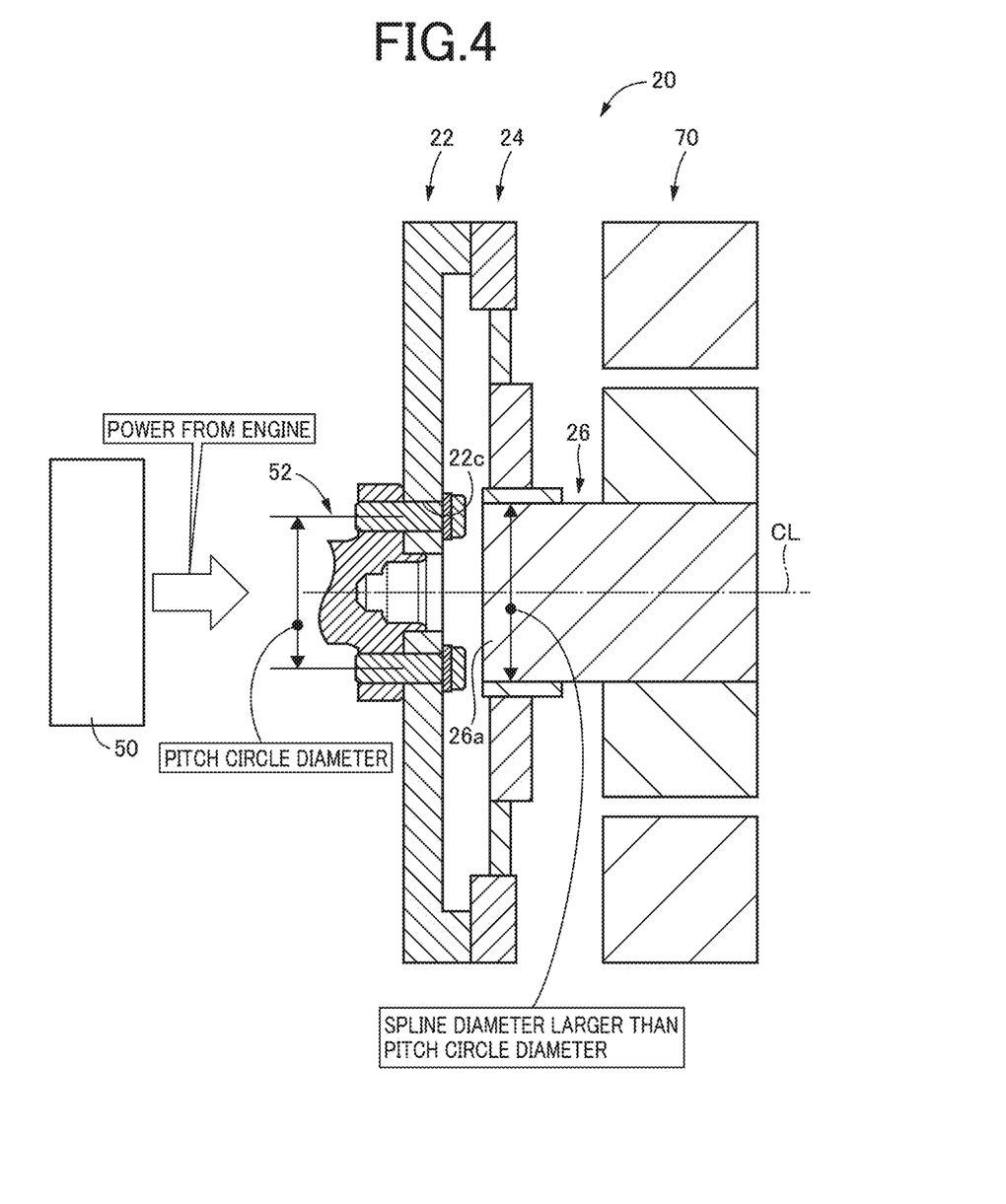
FIG. 4 is a cross sectional view schematically showing a construction of a vehicle power transmission apparatus according to a second embodiment of the present disclosure.

FIG. 4 is a cross sectional view schematically showing a construction of a vehicle power transmission apparatus 20 according to a second embodiment of the present disclosure. As shown in FIG. 4, the power transmission apparatus 20 includes a flywheel 22, a disk 24 and an input shaft 26 that are disposed on the rotation axis CL. The flywheel 22, disk 24 and input shaft 26 are basically the same as the above-described flywheel 12, disk 14 and input shaft 16 in the first embodiment, respectively. There will be described parts in which the power transmission apparatus 20 is different from the power transmission apparatus 10.

The input shaft 26 is constructed such that a spline diameter, i.e., a diameter of an engine-side end portion 26a, which is spline-fitted in the center hole of the disk 24, is larger than a pitch circle diameter, i.e., a diameter of a circumference passing through centers of the bolt receiving holes 22c.

In this second embodiment, the input shaft 26 is constructed such that the spline diameter is made larger than the pitch circle diameter. Thus, it is possible to further increase rigidity of the input shaft 16, as compared with a case in which the diameter of the input shaft 16 cannot be increased due to a constraint such as the diameter of the crankshaft 52. Therefore, resonance of the drive system can be further suppressed even in the damper-less structure.

Third Embodiment

Figure 5:
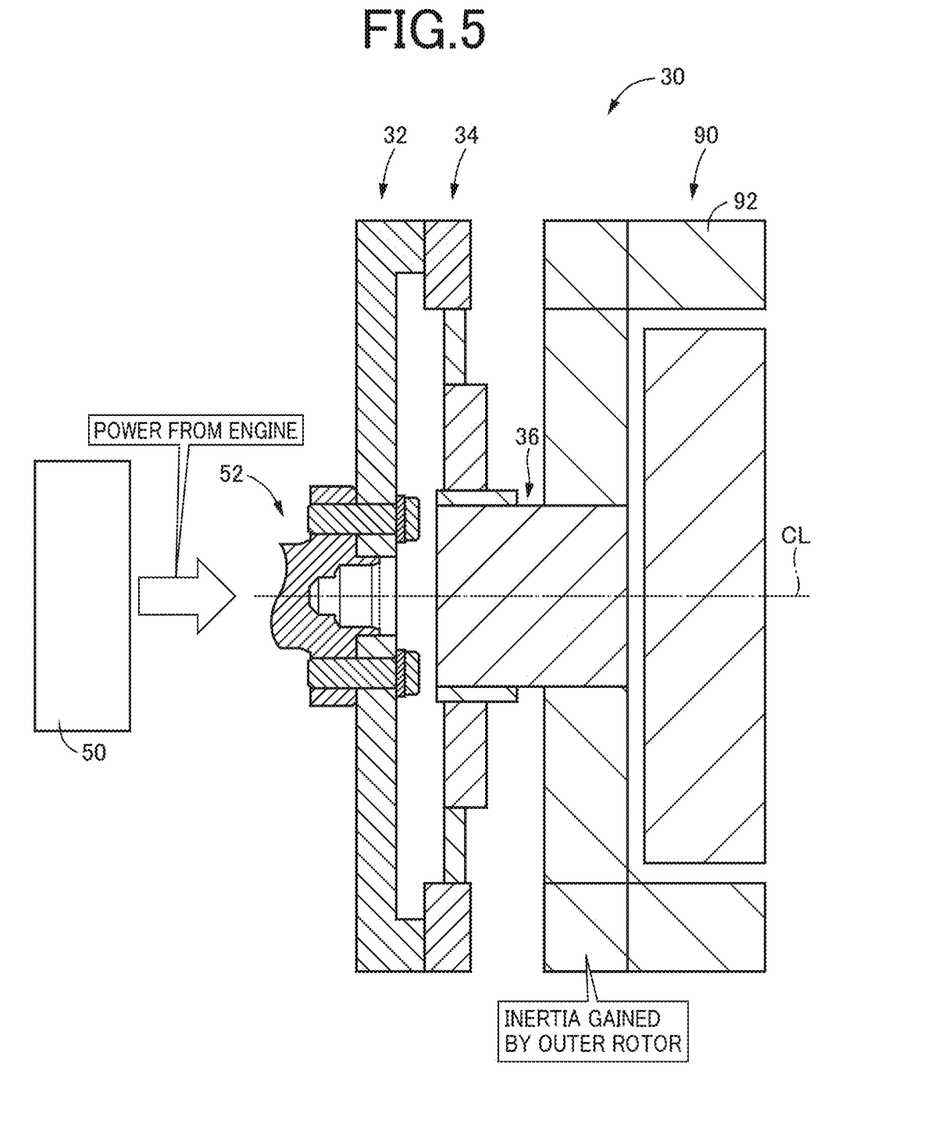
FIG. 5 is a cross sectional view schematically showing a construction of a vehicle power transmission apparatus according to a third embodiment of the present disclosure.

FIG. 5 is a cross sectional view schematically showing a construction of a vehicle power transmission apparatus 30 according to a third embodiment of the present disclosure. As shown in FIG. 5, the power transmission apparatus 30 includes a flywheel 32, a disk 34 and an input shaft 36 that are disposed on the rotation axis CL. The flywheel 32, disk 34 and input shaft 36 are basically the same as the above-described flywheel 22, disk 24 and input shaft 26 in the second embodiment, respectively. There will be described parts in which the power transmission apparatus 30 is different from the power transmission apparatus 20.

The input shaft 36 is connected in a power transmittable manner to a rotor 92 of an electric motor 90 of outer rotor type. As compared with the above-described rotor 72 of the electric motor 70, the rotor 92 of the electric motor 90 can further gain inertia of members connected to the input shaft 36 and the input shaft 36 itself.

In this third embodiment, the input shaft 36 is connected in a power transmittable manner to the rotor 92 of the electric motor 90 of outer rotor type. Thus, inertia can be further gained by the rotor 92 of the electric motor 90 so that it is possible to further suppress resonance of the drive system.

While the embodiments of the present disclosure have been described in detail by reference to the drawings, it is to be understood that the present disclosure may be otherwise embodied.

For example, the present disclosure is applicable to the vehicle power transmission apparatus even where the input shaft is not connected directly to the electric motor. Further, the present disclosure is applicable to the vehicle power transmission apparatus even where the input shaft is connected to the electric motor through a gear mechanism such as a planetary gear device or the like. Still further, the present disclosure is applicable to the vehicle power transmission apparatus even where the input shaft is connected to a torque converter, an automatic transmission or other device other than the electric motor.

While the embodiments of the present disclosure have been described in detail by reference to the drawings, it is to be understood the embodiments described above are given for illustrative purpose only, and that the present disclosure may be embodied with various modifications and improvements which may occur to those skilled in the art.

NOMENCLATURE OF ELEMENTS

10: power transmission apparatus
12: flywheel
12a: center hole
12a1: fitting portion
12b: outer peripheral portion
12c: bolt receiving hole
14: disk
14a: center hole
14b: outer peripheral portion
14e: vulnerable portion (thin portion)
16: input shaft
16a: engine-side end portion
16a1: outer circumferential surface
20: vehicle power transmission apparatus
22: flywheel
24: disk
26: input shaft
26a: engine-side end portion
30: vehicle power transmission apparatus
32: flywheel
34: disk
36: input shaft
50: engine
52: crankshaft
52a: end portion
52a1: outer circumferential surface
52b: flange portion
60: fastening bolt
70: electric motor (generator)
72: rotor
80: electric motor
90: electric motor
92: rotor

What is claimed is:

1. A vehicle power transmission apparatus comprising:
a flywheel provided with a center hole in which an end portion of a crankshaft of an engine is to be inserted such that an outer circumferential surface of the end portion of the crankshaft is to be fitted in a fitting portion of the center hole;
an input shaft to which a power of the engine is to be transmitted through the flywheel; and
a disk including an outer peripheral portion that is connected to an outer peripheral portion of the flywheel, and provided with a center hole that is spline-fitted on an outer circumferential surface of an engine-side end portion of the input shaft,
wherein the outer circumferential surface of the engine-side end portion of the input shaft, which is spline-fitted in the center hole of the disk, has a diameter larger than a diameter of the fitting portion of the center hole of the flywheel which is to be fitted on the outer circumferential surface of the end portion of the crankshaft.

2. The vehicle power transmission apparatus according to claim 1,
wherein the flywheel is provided with a plurality of bolt receiving holes which are located on an outer side of the center hole in a radial direction of the flywheel and which are arranged at a predetermined interval in a circumferential direction of the flywheel, such that the flywheel is to be fastened to a flange portion of the crankshaft located on an outer side of the end portion of the crankshaft in a radial direction of the crankshaft, by fastening bolts received in the bolt receiving holes, and
wherein the diameter of the outer circumferential surface of the engine-side end portion of the input shaft, which is spline-fitted in the center hole of the disk, is larger than a diameter of a circumference passing through centers of the bolt receiving holes.

3. The vehicle power transmission apparatus according to claim 1,
wherein the disk includes an annular-shaped thin portion which is located on an outer side of the center hole that is spline-fitted on the input shaft, in a radial direction of the disk, and which has a thickness smaller than other portions of the disk.

4. The vehicle power transmission apparatus according to claim 3,
wherein the input shaft is configured to connect to a generator, in a power transmittable manner, the generator is configured to generate an electric power, by the power of the engine, the electric power is supplied to an electric motor configured to generate a drive torque.

5. The vehicle power transmission apparatus according to claim 1,
wherein the input shaft is configured to connect to a rotor, in a power transmittable manner, of an electric motor of inner rotor type or outer rotor type.

* * * * *